(12) United States Patent
Ono et al.

(10) Patent No.: US 8,326,083 B2
(45) Date of Patent: Dec. 4, 2012

(54) IMAGE PROCESSING CIRCUIT, DISPLAY DEVICE, AND PRINTING DEVICE

(75) Inventors: Yoshiyuki Ono, Hino (JP); Takashi Sawasaki, Chofu (JP); Akira Saito, Sagamihara (JP)

(73) Assignee: Seiko Epson Corporation, Tokyo (JP)

( * ) Notice: Subject to any disclaimer, the term of this patent is extended or adjusted under 35 U.S.C. 154(b) by 1153 days.

(21) Appl. No.: 12/222,422

(22) Filed: Aug. 8, 2008

(65) Prior Publication Data

US 2009/0046949 A1 Feb. 19, 2009

(30) Foreign Application Priority Data

Aug. 14, 2007 (JP) ................................. 2007-211255

(51) Int. Cl.
*G06K 9/36* (2006.01)

(52) U.S. Cl. ......... 382/284; 345/562; 345/629; 358/1.9; 358/2.1; 382/103; 382/289; 715/806; 715/823

(58) Field of Classification Search .................. None
See application file for complete search history.

(56) References Cited

U.S. PATENT DOCUMENTS

| | | | |
|---|---|---|---|
| 4,330,834 A | 5/1982 | Murphy | |
| 4,992,781 A | 2/1991 | Iwasaki et al. | |
| 5,430,838 A * | 7/1995 | Kuno et al. | 715/806 |
| 5,668,941 A | 9/1997 | Noorbakhsh | |
| 6,084,988 A * | 7/2000 | Kanno et al. | 382/289 |
| 6,100,997 A * | 8/2000 | Shimamura | 358/1.9 |
| 6,184,860 B1 * | 2/2001 | Yamakawa | 715/823 |
| 6,661,425 B1 * | 12/2003 | Hiroaki | 345/629 |
| 7,702,131 B2 * | 4/2010 | Chinen et al. | 382/103 |
| 2005/0168473 A1 * | 8/2005 | Nishi | 345/562 |
| 2009/0046948 A1 * | 2/2009 | Ono et al. | 382/284 |

FOREIGN PATENT DOCUMENTS

| | | |
|---|---|---|
| EP | 0 989 536 A1 | 3/2000 |
| JP | A-3-28984 | 2/1991 |
| JP | A-05-210381 | 8/1993 |
| JP | A-5-210381 | 8/1993 |
| JP | A-10-31735 | 2/1998 |
| JP | A-2009-47748 | 3/2009 |
| JP | A-2009-47749 | 3/2009 |
| JP | A-2009-48247 | 3/2009 |
| JP | A-2009-48249 | 3/2009 |
| WO | WO 95/12164 | 5/1995 |
| WO | WO 96/20470 | 7/1996 |

* cited by examiner

*Primary Examiner* — Tsung-Yin Tsai
(74) *Attorney, Agent, or Firm* — Oliff & Berridge, PLC

(57) ABSTRACT

An image processing circuit includes: a memory that stores the location and pixel values that compose graphical images; a calculation unit that calculates the difference between a target location to which the graphical images is aligned in binary image data and an initial location designated in the graphical images; an output unit that outputs pixel values at locations distanced from the locations of the pixel values by an amount equivalent to the calculated difference; a first multiplier that multiplies the output pixel value with the pixel value included in the binary image data; an inverter that inverts the pixel value in the binary image data; a second multiplier that multiplies the pixel values in the binary image data or the pixel values included in background image data with the inverted pixel values; and an adder that adds the result of the multiplications performed by the first and second multipliers.

8 Claims, 11 Drawing Sheets

IMAGE PROCESSING CIRCUIT, DISPLAY DEVICE, AND PRINTING DEVICE

The entire disclosure of Japanese Patent Application No. 2007-211255 filed on Aug. 14, 2007 is expressly incorporated by reference thereto, herein.

BACKGROUND

1. Technical Field

The present invention relates to a technique for disposing multiple graphical images in an arrangement within an image region.

2. Related Art

A technique called a "hatching process" is known in the field of image processing. This "hatching process" refers to a process that performs half-tone dot meshing, texturing, and the like by disposing, in an arrangement and with regularity, multiple graphical images within an image region made up of characters, tables, graphics, or the like. For example, Japanese Patent Application No. JP-A-5-210381 discloses a technique that quickly expands a hatching pattern in a frame memory using a BitBlt (Bit-Boundary Block Transfer) circuit that repeatedly transfers block patterns used for hatching rendering into specified regions.

Although the technique disclosed in JP-A-5-210381 is convenient when performing a hatching process on a region of a size that is an integral multiple of the size of the block pattern, it cannot perform an effective hatching process in other cases. For example, even if a hatching process is enabled for regions of arbitrary size by reducing the block pattern to an extremely small size, it is necessary to determine and specify, in detail, the addresses of the regions to which that block pattern is transferred. Therefore, when performing a hatching process on an image that has a complex shape, such as a character or the like, the operations and processing for specifying the transfer destinations of the block pattern become very complicated.

Accordingly, the following technique can be considered for executing, with ease, a hatching process only on image regions of various shapes and sizes. For example, a hatching pattern made up of multiple graphical images arranged with regularity at predetermined intervals is contrasted against an input image on which the hatching process is to be performed; then, only the graphical images located within the rendering region of the input image are extracted from the hatching pattern, and are then disposed in an arrangement in the rendering region of the input image.

However, when a hatching process is performed using such a technique, there are cases where skew occurs between the graphical images contained in the hatching pattern and the rendering region in the input image. In other words, the location of each graphical image in the hatching pattern and the location of the rendering region of the input image are determined independently of each other, and thus there are instances where parts of the graphical images contained in the hatching pattern appear absent at the ends of the rendering region of the input image. When graphical images in the hatching appear absent in this manner, a problem in which the beauty of the hatching, the visibility of the graphical images, and the like are impaired, leading to the degradation of image quality, arises. This problem becomes particularly apparent with hatching that disposes, in an arrangement, graphical images whose overall shape cannot easily be recognized if some of the graphical images are absent, such as star-shaped graphical images, graphical images with a flower motif, and the like.

SUMMARY

In light of the background, it is an advantage of some aspects of the present invention to reduce skew between graphical images included in a hatching pattern and the rendering region of an input image to the greatest extent possible when performing a hatching process on the rendering region of the input image.

An aspect of the invention provides an image processing circuit comprising: a image memory that stores the location and pixel value of each pixel that composes a plurality of graphical images disposed in an arrangement; a calculation unit that calculates the difference between a target location representative of a target to which the graphical images are to be aligned in binary image data in which the pixel value at each location is expressed as a binary value that includes 0 and an initial location representative of an initial point in the graphical images for aligning to the binary image data; a pixel value output unit that outputs pixel values at locations distanced from the locations of the pixel values stored in the image memory by an amount equivalent to the difference calculated by the calculation unit; a first multiplier that multiplies the pixel value at each location output by the pixel value output unit with the pixel value at each location included in the binary image data, for each of the corresponding pixel locations; an inverter that inverts the pixel value at each location in the binary image data; a second multiplier that multiplies the pixel values at each location in the binary image data or the pixel values at each location included in background image data that is to be the background of an image based on the binary image data with the pixel values inverted by the inverter, for each of the corresponding pixel locations; and an adder that adds the result of the multiplication performed by the first multiplier with the result of the multiplication performed by the second multiplier for each of the corresponding pixel locations and outputs the result of the adding as output image data.

In the above-mentioned aspect of the invention, when performing a hatching process on a rendering region of an image expressed by binary image data, the skew between the graphical images included in the hatching pattern and the rendering region of the input image can be reduced.

According to another aspect of the invention, the image processing circuit may further comprise a location memory that stores the target location in the binary image data and the initial location in the graphical images, wherein the calculation unit calculates the difference between the target location and the initial location stored in the location memory.

In the above-mentioned aspect of the invention, when performing a hatching process on a rendering region of an image expressed by binary image data, the skew between the graphical images included in the hatching pattern and the rendering region of the input image can be reduced, even without specifying the target location and initial location in detail.

According to yet another aspect of the invention, the image processing circuit may further comprise a target acceptor that accepts a designation of the target location made by a user; and an initial point specification unit that specifies the initial location in the graphical images in accordance with the target location accepted by the target acceptor, wherein the calculation unit calculates the difference between the target location accepted by the target acceptor and the initial location specified by the initial point specification unit.

In the above-mentioned aspect of the invention, a user can designate a desired target location, can the location of the initial point can be automatically determined in accordance with the target location designated by the user.

According to yet another aspect of the invention, the image processing circuit may further comprise an initial location memory that stores the initial location representative of the initial point for each graphical image; and an initial point specification unit that specifies, from among the plurality of initial locations stored in the initial location memory, the initial location that is closest to the target location as the initial location of the initial point for aligning to the binary image data, wherein the calculation unit calculates the difference between the target location and the initial location specified by the initial point specification unit.

In the above-mentioned aspect of the invention, the difference between the target location and the initial location can be reduced.

According to yet another aspect of the invention, the image processing circuit may further comprise a first memory that stores the location of each pixel that composes the plurality of graphical images; a second memory that stores color information expressing a color of the graphical images as a pixel value of each pixel that composes the plurality of graphical images; and a color information output unit that outputs the color information stored in the second memory as pixel values of the pixels in each location stored in the first memory.

In the above-mentioned aspect of the invention, graphical images of the color of the color information stored in the second memory can be disposed in an arrangement in a rendering region of an image expressed by binary image data.

According to yet another aspect of the invention, the second memory may store a plurality of types of color information; and the color information output unit may output one of the plurality of types of color information stored in the second memory for each pixel that composes the same type of graphical image among the plurality of graphical images.

In the above-mentioned aspect of the invention, graphical images of the same type and same color can be disposed in an arrangement in the rendering region of an image expressed by binary image data.

According to yet another aspect of the invention, the image processing circuit may further comprise a designator that designates the pixel values at each location in the binary image data or the pixel values at each location included in background image data that expresses the background of an image based on the binary image data; and a supplier that supplies the pixel values designated by the designator to the second multiplier.

In the above-mentioned aspect of the invention, the pixel values at each location in the binary image data or the pixel values at each location included in background image data that expresses the background of an image based on the binary image data can be designated as the pixel values of the background region in the output image expressed by the output image data.

According to yet another aspect of the invention, the image processing circuit may further comprise a designator that designates a third memory that stores preset background color information or a fourth memory that stores image information to be output to a display or a printer; and a supplier that reads out the information stored in the memory designated by the designator as pixel values in the background image data and supplies the information to the second multiplier.

In the above-mentioned aspect of the invention, a third memory that stores preset background color information or a fourth memory in which image information to be output to a display or a printer is expanded can be designated as a memory to supply the pixel values of the background region in the output image expressed by the output image data.

Yet another aspect of the invention provides a display device comprising an image processing circuit according to one of the abovementioned aspects of the invention and a display that displays an image based on the output image data output by the adder.

In the above-mentioned aspect of the invention, when performing a hatching process on a rendering region of an input image, the skew between the graphical images included in the hatching pattern and the rendering region of the input image can be reduced, and furthermore, the image obtained as a result can be displayed.

Yet another aspect of the invention provides a printing device comprising an image processing circuit according to one of the abovementioned aspects of the invention and a printer that prints based on the output image data output by the adder.

In the above-mentioned aspect of the invention, when performing a hatching process on a rendering region of an input image, the skew between the graphical images included in the hatching pattern and the rendering region of the input image can be reduced, and furthermore, the image obtained as a result can be printed.

BRIEF DESCRIPTION OF THE DRAWINGS

Exemplary embodiments of the invention will be described in detail based on the following figures, wherein.

DESCRIPTION OF EXEMPLARY EMBODIMENTS

In the exemplary embodiment described hereinafter, the process of disposing multiple graphical images in an arrangement within a certain image region will be called "hatching". The multiple graphical images arranged during this process may all be identical to one other, similar to one other, or different from one another. For example, a hatching technique called "linear hatching" can be performed by disposing line segments that all extend in the same direction repeatedly at equal intervals. Meanwhile, a hatching technique called "cross-hatching" can be performed by disposing line segments that extend in one of two directions repeatedly at equal respective intervals. Furthermore, a hatching technique that alternates between heart-shaped and clover-shaped graphics and a hatching technique that randomly disposes abstract graphics that are all shaped differently from one another in an arrangement can be considered. In other words, the size and shape or number of the graphical images used for hatching may be freely determined.

Figure 1:
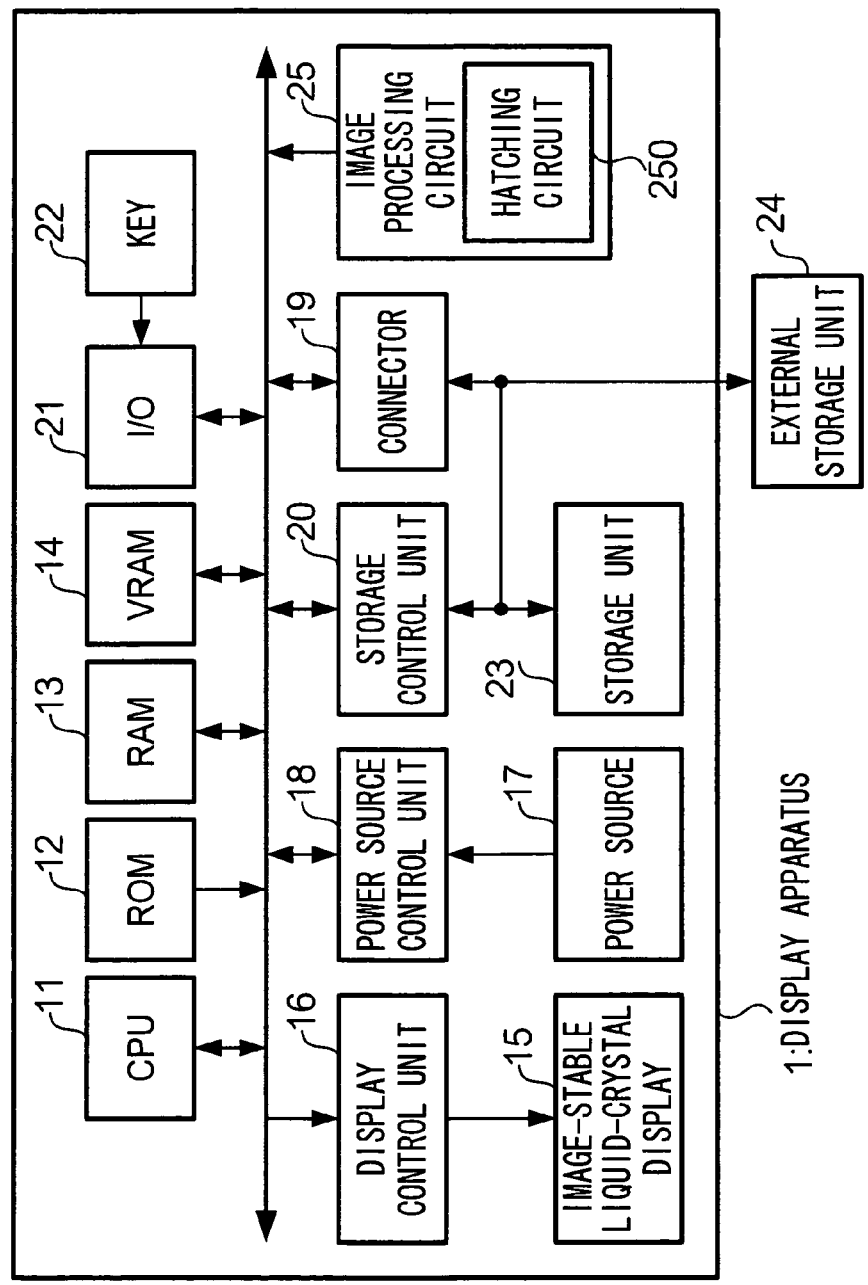
FIG. 1 is a diagram illustrating the configuration of an display apparatus 1.

FIG. 1 is a diagram illustrating the configuration of an image display apparatus 1 according to the present exemplary embodiment.

As shown in FIG. 1, the image display apparatus 1 includes: a central processing unit (CPU) 11; a read-only memory (ROM) 12; a random access memory (RAM) 13; a video random access memory (VRAM) 14; an image-stable liquid-crystal display 15; a display control unit 16; a power source 17; a power source control unit 18; a connector 19; a storage control unit 20; an I/O 21; a key 22; a storage device 23; and an image processing circuit 25. The CPU 11 reads out a control program stored in the ROM 12, expands it in the RAM 13, and executes processing in accordance with the procedure written in the control program. The key 22 is an operational unit operated by a user, and includes an operational device such as a pen device, a joystick, or the like. The I/O 21 monitors the operational state of the key 22, and when the key 22 is operated by the user, supplies a signal to the CPU 11 in response to the operation. The power source 17 is, for example, a rechargeable battery; the power source control unit 18 performs various types of power source management, such as on/off control of the power source 17, monitoring the remaining power, and so on.

A external storage unit 24, such as a removable medium, can be attached/removed to/from the connector 19. The external storage unit 24 may be a card-type storage medium that includes a flash memory, such as, for example, a Secure Digital (SD) card, or may be a disk-type storage medium that uses a magnetic medium, such as, for example, a flexible disk. The storage device 23 is a non-volatile storage medium, such as a flash memory or a hard disk, and is provided within the display apparatus 1. A computational program for computing values for instructing the operations of a hatching circuit 250 is stored within the storage device 23. Furthermore, image data expressing images such as text, graphics, and images (photographic images) is stored in the storage device 23 or the storage medium 24. This image data is binary data consisting of pixel values of "0", which expresses white, and pixel values of "1", which expresses black. A region in which pixels having pixel values of "1" are located is the rendering region of an image, whereas a region in which pixels having pixel values of "0" are located is the non-rendering region of the image. The storage control unit 20 reads out image data from the storage device 23 or the external storage unit 24 and supplies the image data to the image processing circuit 25 under the instruction of the CPU 11.

The image processing circuit 25 includes the hatching circuit 250. The hatching circuit 250 performs hatching on the image data supplied under the instruction of the CPU 11, and outputs the image data on which the hatching has been performed to the VRAM 14. The VRAM 14 is a frame buffer, and stores one page's worth of image data to be displayed in the image-stable liquid-crystal display 15. The image-stable liquid-crystal display 15 is a display unit that uses cholesteric liquid crystal, electrophoresis, or the like, and has an image-stable property through which it is possible to continue displaying an image even after the power supply has been stopped. The image data stored in the VRAM 14 is supplied to the display control unit 16 under instruction of the CPU 11. The display control unit 16 controls the image-stable liquid-crystal display 15, causing it to display an image based on the supplied image data.

Figure 2:
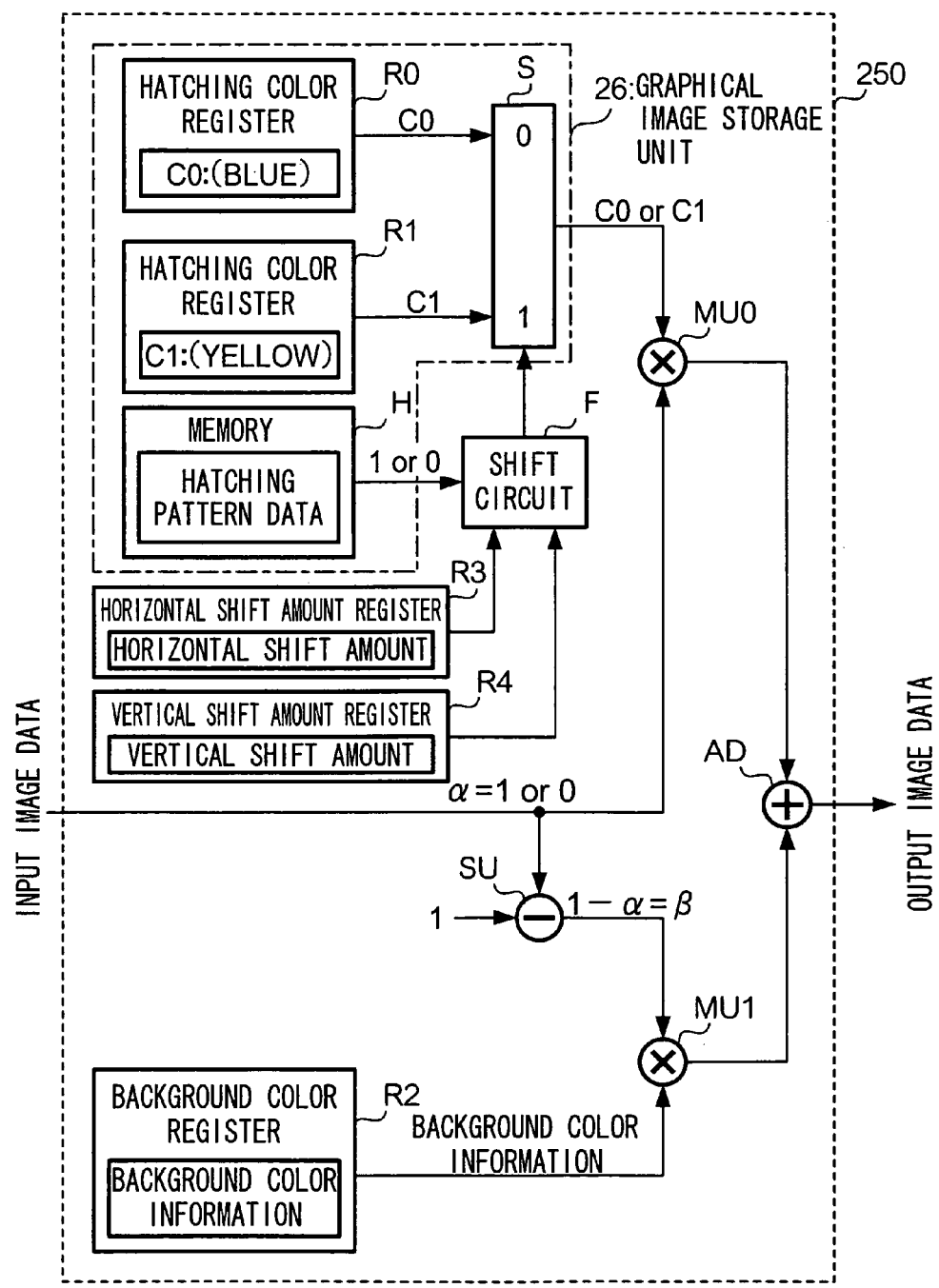
FIG. 2 is a diagram illustrating the configuration of a hatching circuit 250.

FIG. 2 is a diagram illustrating the configuration of the hatching circuit 250.

As shown in FIG. 2, the hatching circuit 250 includes: a memory H; hatching color registers R0 and R1; a background color register R2; a horizontal shift amount register R3; a vertical shift amount register R4; a shift circuit F; a selector S; multipliers MU0 and MU1; a subtractor SU; and an adder AD. Binary image data read out from the storage device 23 or the external storage unit 24 is input into the hatching circuit 250 as input image data. In this input image data, a pixel value of "0" expresses white (a minimum density), whereas a pixel value of "1" expresses black (a maximum density). The result of the hatching process performed by the hatching circuit 250 on the input image data is output as output image data. The location of each pixel that makes up a hatching pattern (in other words, multiple graphical images) used for the hatching process is stored in the memory H as hatching pattern data.

Figure 3:
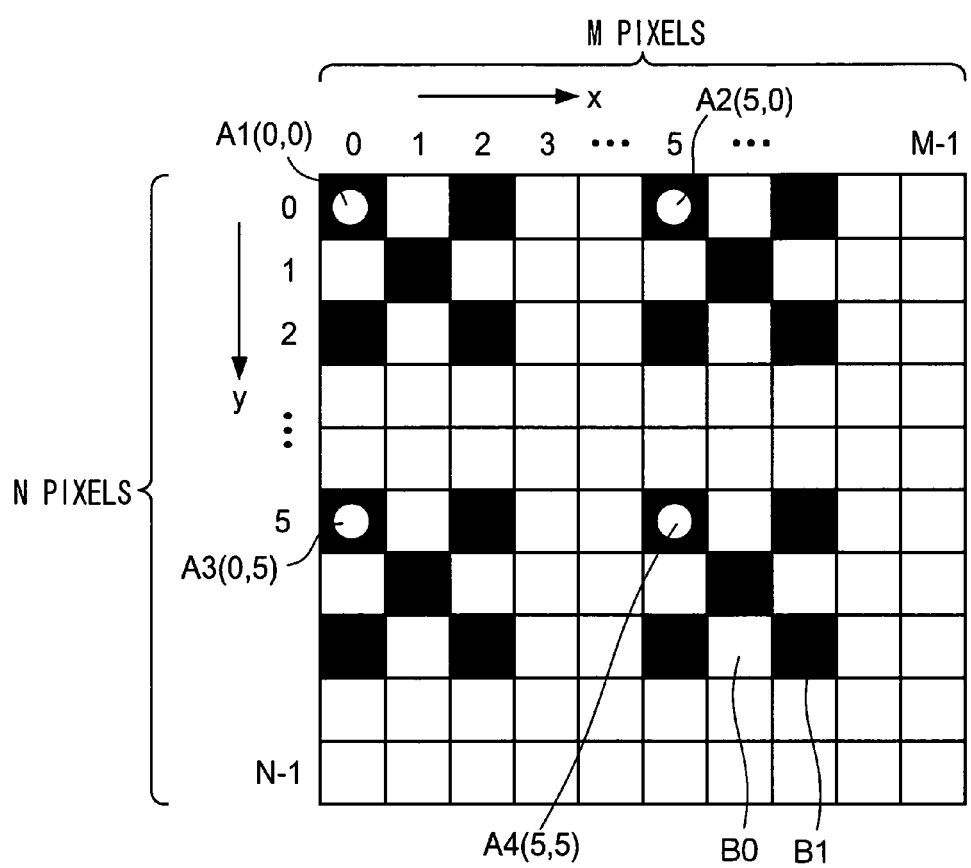
FIG. 3 is a diagram illustrating hatching pattern data for performing a floral pattern hatching.

FIG. 3 is a diagram schematically illustrating hatching pattern data for performing a floral pattern hatching.

This hatching pattern data is binary pattern bit values of either "0" or "1" expressing multiple graphical images in a flower motif. In FIG. 3, a pattern bit value of "0" is disposed at the location of each pixel that makes up a white block B0, whereas a pattern bit value of "1" is disposed at the location of each pixel that makes up a black block B1. The size of the entire hatching pattern expressed by this hatching pattern data is the same size as one page's worth of an image secured in the VRAM 14. Although the blocks B0 and B1 are both composed of multiple pixels (for example, 16×16, or 256, pixels), here, for the sake of simplicity, a single block will be described as being composed of a single pixel. In this case, the overall length of the hatching pattern in the horizontal direction corresponds to a number of pixels M in the horizontal direction of one page's worth of an image stored in the VRAM 14. In addition, the overall length of the hatching pattern in the vertical direction corresponds to a number of pixels N in the vertical direction of one page's worth of an image stored in the VRAM 14.

In the following descriptions, the location coordinates of the pixel located in the upper-left end of the hatching pattern data are taken as (0, 0), and the location coordinates of a pixel located i pixels in the x direction (right direction) and j pixels in the y direction (lower direction) from the pixel at location coordinates (0, 0) in the diagram are taken as (i, j). Therefore, for example, a pixel located one pixel in the x direction from the pixel at location coordinates (0, 0) is the pixel at location coordinates (1, 0), a pixel located two pixels in the x direction from the pixel at location coordinates (0, 0) is the pixel at location coordinates (2, 0), and a pixel located three pixels in the x direction from the pixel at location coordinates (0, 0) is the pixel at location coordinates (3, 0). Similarly, a pixel located one pixel in the y direction from the pixel at location coordinates (0, 0) is the pixel at location coordinates (0, 1), and a pixel located two pixels in the y direction from the pixel at location coordinates (0, 0) is the pixel at location coordinates (0, 2). This method for expressing location coordinates is not limited to the hatching pattern shown in FIG. 3, and also applies to the input image data input into the hatching circuit 250 (illustrated later in FIG. 4), the output image data output from the hatching circuit 250 (illustrated later in FIG. 8), and so on.

Meanwhile, the location coordinates of the initial points of each graphical image of which the hatching pattern data is composed are stored, in advance, in the storage device 23. The "initial point of an image" discussed in the present exemplary embodiment refers to the location of the pixel closest to the pixel at location coordinates (0, 0), whereas the "initial location" refers to the location coordinates of that initial point. In other words, the location coordinates of the pixels in the upper-left end of each of the graphical images are stored in the storage device 23 as initial locations. For example, in the case of FIG. 3, each graphical image is composed of five horizontal pixels by five vertical pixels. Accordingly, the location coordinates (0, 0) of an initial point A1, the location coordinates (5, 0) of an initial point A2, the location coordinates (0, 5) of an initial point A3, the location coordinates (5, 5) of an initial point A4, and so on are stored in the storage device 23 as initial locations of the hatching pattern data.

The descriptions will now return to FIG. 2.

The hatching color register R0 stores color information expressing the color of pixels in locations in the hatching pattern data where the pattern bit value is "0". It is assumed that, for example, color information "C0", expressing blue, is stored here. The hatching color register R1 stores color information expressing the color of pixels in locations in the hatching pattern data where the pattern bit value is "1". It is assumed that, for example, color information "C1", expressing yellow, is stored here. This color information originally includes information specifying both the color itself and gradation values thereof. However, the present exemplary embodiment uses binary values for the gradation values of the color information, taking into consideration only whether or not the color expressed by the color information is present; therefore, the color information "C0" alone indicates "blue", and simultaneously indicates that that color is "present". Likewise, the color information "C1" indicates "yellow", and simultaneously indicates that that color is "present".

The horizontal shift amount register R3 stores a horizontal shift amount for shifting the pattern bit values at each location in the hatching pattern data in the x direction of FIG. 3. This horizontal shift amount is calculated and written into the horizontal shift amount register R3 by the CPU 11 each time new image data is input into the hatching circuit 250. The vertical shift amount register R4 stores a vertical shift amount for shifting the pattern bit values at each location in the hatching pattern data in the y direction of FIG. 3. In the same manner as described above, this vertical shift amount is also calculated and written into the vertical shift amount register R4 by the CPU 11 each time new image data is input into the hatching circuit 250.

The shift circuit F outputs values resulting from shifting the pattern bit values included in the hatching pattern data supplied by the memory H in the x direction of FIG. 3 by the horizontal shift amount supplied by the horizontal shift amount register R3, and in the y direction of FIG. 3 by the vertical shift amount supplied by the vertical shift amount register R4.

The color information "C0" stored in the hatching color register R0 and the color information "C1" stored in the hatching color register R1 are input, as input signals, into the selector S. Furthermore, the pattern bit values at each location output by the shift circuit F are sequentially input, as selection signals, into the selector S, in the order of the location coordinates of the pixels described above. During the period in which the pattern bit value "0" is input as the selection signal, the selector S selects and outputs the color information "C0", whereas during the period in which the pattern bit value "1" is input as the selection signal, the selector S selects and outputs the color information "C1".

The abovementioned memory H functions as a first memory that stores the locations of the pixels that make up the hatching pattern. Meanwhile, the hatching color registers R0 and R1 function as a second memory that stored the color information expressing the colors of the hatching pattern as pixel values of the pixels that make up the hatching pattern. Furthermore, the selector S functions as a color information output unit that outputs the color information stored in the hatching color registers R0 and R1 as pixel values of the pixels at the locations stored in the memory H. Ultimately, the memory H, the hatching color registers R0 and R1, and the selector S operate cooperatively, functioning as a graphical image storage unit 26 that stores the locations and pixel values of the pixels that make up the hatching pattern.

The multiplier MU0 is a first multiplier, and multiplies the color information "C0" or "C1" output by the selector S with the pixel values "0" (white) or "1" (black) included in the input image data for each of the corresponding pixel locations, outputting the resultant. "Corresponding location" means that the location coordinates of the pixel shown in FIG. 3 being identical. The pixel value of "0" or "1" in this input image data will be called "$\alpha$". In other words, "C0" or "C1" and "$\alpha$" are input into the multiplier MU0, and "$\alpha \times C0$" or "$\alpha \times C1$" is output from the multiplier MU0.

The pixel value "$\alpha$" of the input image data and a value of "1" are input into the subtractor SU, and "$\alpha$" is subtracted from the value "1", resulting in "$1-\alpha$", "$1-\alpha$" then being taken as "$\beta$" and output. As a result, when the pixel value "$\alpha$"=1, that 1 is inverted by the subtractor SU and "0" is output, whereas when the pixel value "$\alpha$"=0, that 0 is inverted by the subtractor SU and "1" is output. In other words, the subtractor SU functions as an inverter that inverts a pixel value expressed as a binary value.

The background color register R2 stores color information expressing a color of the non-rendering region (in other words, a background region that serves as the back ground of the image based on the input image data) present when the image expressed by the input image data is displayed in the image-stable liquid-crystal display 15. This color information expresses, for example, white. The image processing circuit 25 is configured so as to render the image expressed by the input image data on top of the background region that has a predetermined color. For this reason, the color information of the background region is stored in the background color register R2. This color information of the background region will be called "background color information" hereinafter.

The multiplier MU1 is a second multiplier, and multiplies "$\beta$" output by the subtractor SU with the background color information supplied by the background color register R2 for each of the corresponding pixel locations, outputting the resultant. In other words, "$\beta \times$background color information" is output from the multiplier MU1 as the color information.

The adder AD adds "$\alpha \times C0$" or "$\alpha \times C1$" output by the multiplier MU0 with "$\beta \times$background color information" output by the multiplier MU1 for each of the corresponding pixel locations, outputting the resultant of the adding as output image data. In other words, color information resulting from "$\alpha \times C0 + \beta \times$background color information" or color information resulting from "$\alpha \times C1 + \beta \times$background color information" is output by the adder AD as color information of each pixel included in the output image data.

Next, operations of the hatching circuit 250 will be described in detail.

Figure 4:
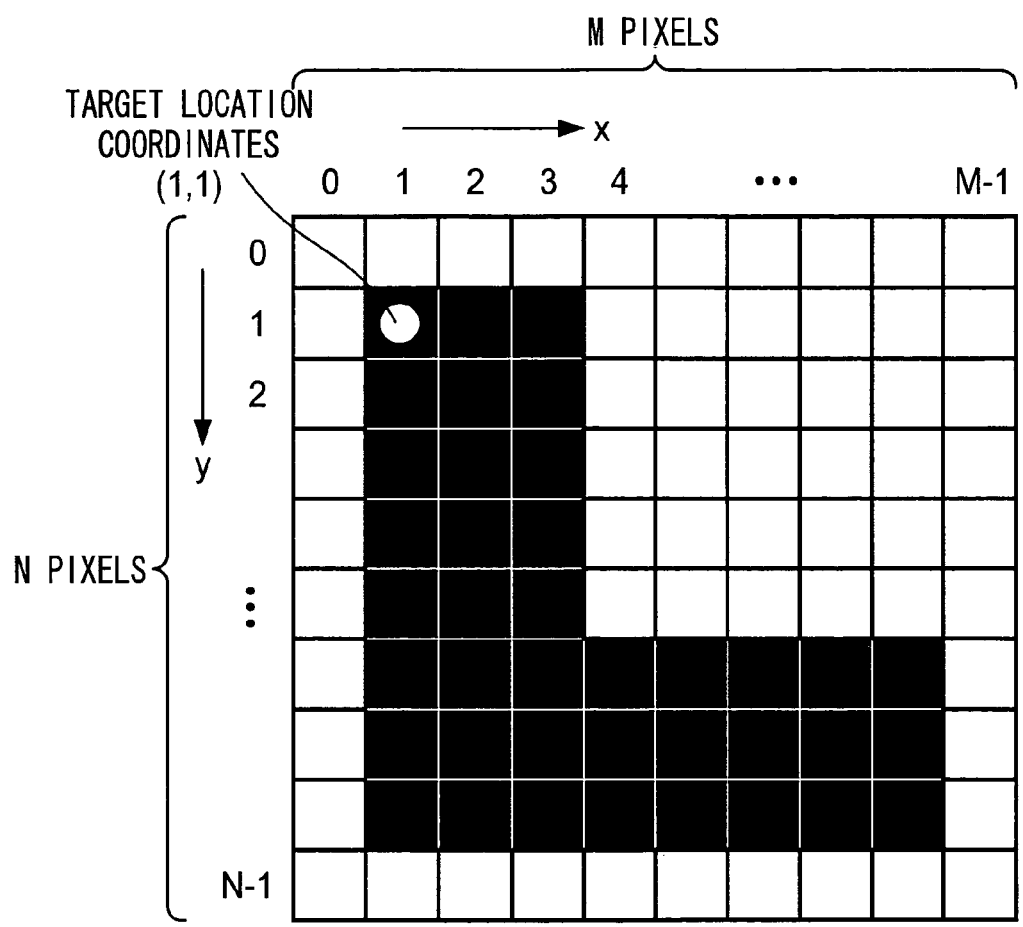
FIG. 4 is a diagram illustrating an example of input image data input into the hatching circuit 250.

FIG. 4 is a diagram schematically illustrating input image data expressing an input image in which an image of the character "L" has been rendered, the image being an example of input image data input into the hatching circuit 250. This input image is composed of M pixels in the x direction (right direction) and N pixels in the y direction (vertical direction), in the same manner as the hatching pattern shown in FIG. 3. The pixel value of each pixel is "0" for white portions of FIG. 4 and "1" for black portions of FIG. 4. The region in which the pixel values are "1" is the rendering region in which the image of the character "L" is rendered, whereas the region in which the pixel values are "0" is the non-rendering region in which the image of the character is not rendered. Hereinafter, operations carried out when such input image data is input into the hatching circuit 250 will be described as an example.

First, the CPU 11 calculates a shifting amount by which to shift the pattern bit values at each location in the hatching pattern data, or in other words, the horizontal shift amount and the vertical shift amount, based on the location coordinates of the initial point stored in the storage device 23 in advance for each input image expressed by each piece of input image data and the location coordinates of the initial point of the hatching pattern data stored in the storage device 23. The calculation of this shifting amount is carried out by the CPU 11 executing a computational program stored in the storage device 23.

The method for calculating the horizontal shift amount and the vertical shift amount will be described in detail.

First, the CPU 11 reads out the initial location of the image of the character "L" shown in FIG. 4 from the storage device 23. As described earlier, the "initial point of the image" is the location of the pixel closest to the pixel at location coordinates (0, 0), and therefore, with, for example, the input image data shown in FIG. 4, the location coordinates (1, 1) of the pixel at the upper-left end of the image of the character "L" are read out from the storage device 23 as the initial location. These location coordinates serve as a target to which the graphical images included in the hatching pattern are to be aligned, and therefore, in the following descriptions, the location coordinates of the initial point will be called "target location coordinates".

Next, the CPU 11 reads out the initial locations of the hatching pattern data stored in the storage device 23. The CPU 11 then identifies the initial location closest to the target location coordinates in the x and y directions, from the multiple initial locations that have been read out. In this example, the target location coordinates are (1, 1), and thus the location coordinates (0, 0) of the initial point A1 shown in FIG. 3 are identified. In other words, by executing the computational program, the CPU 11 functions as an initial point specification unit that specifies, from among the multiple initial locations stored in the location memory, the initial location closest to the target location as the initial location of the initial point for alignment with the input image data. In the following descriptions, the location coordinates that have been identified will be called "initial location coordinates".

Next, the CPU 11 calculates a value in which the initial location coordinates have been subtracted from the target location coordinates, for each of the x and y directions. In this example, when the initial location coordinates (0, 0) are subtracted from the target location coordinates (1, 1), the subtraction value in the x direction is calculated as 1−0, or "1", and the subtraction value in the y direction is also calculated as 1−0, or "1". In other words, by executing a computational program, the CPU 11 functions as a calculation unit that calculates the difference between the target location designated in the input image data as the target to which the graphical images are to be aligned and the initial location designated in the graphical images as the initial point for aligning to the input image data (here, this is indicated by the initial location coordinates). The subtraction value "1" in the x direction calculated in this manner is written by the CPU 11 into the horizontal shift amount register R3 as the horizontal shift amount. The subtraction value "1" in the y direction, meanwhile, is written by the CPU 11 into the vertical shift amount register R4 as the vertical shift amount.

Figure 5:
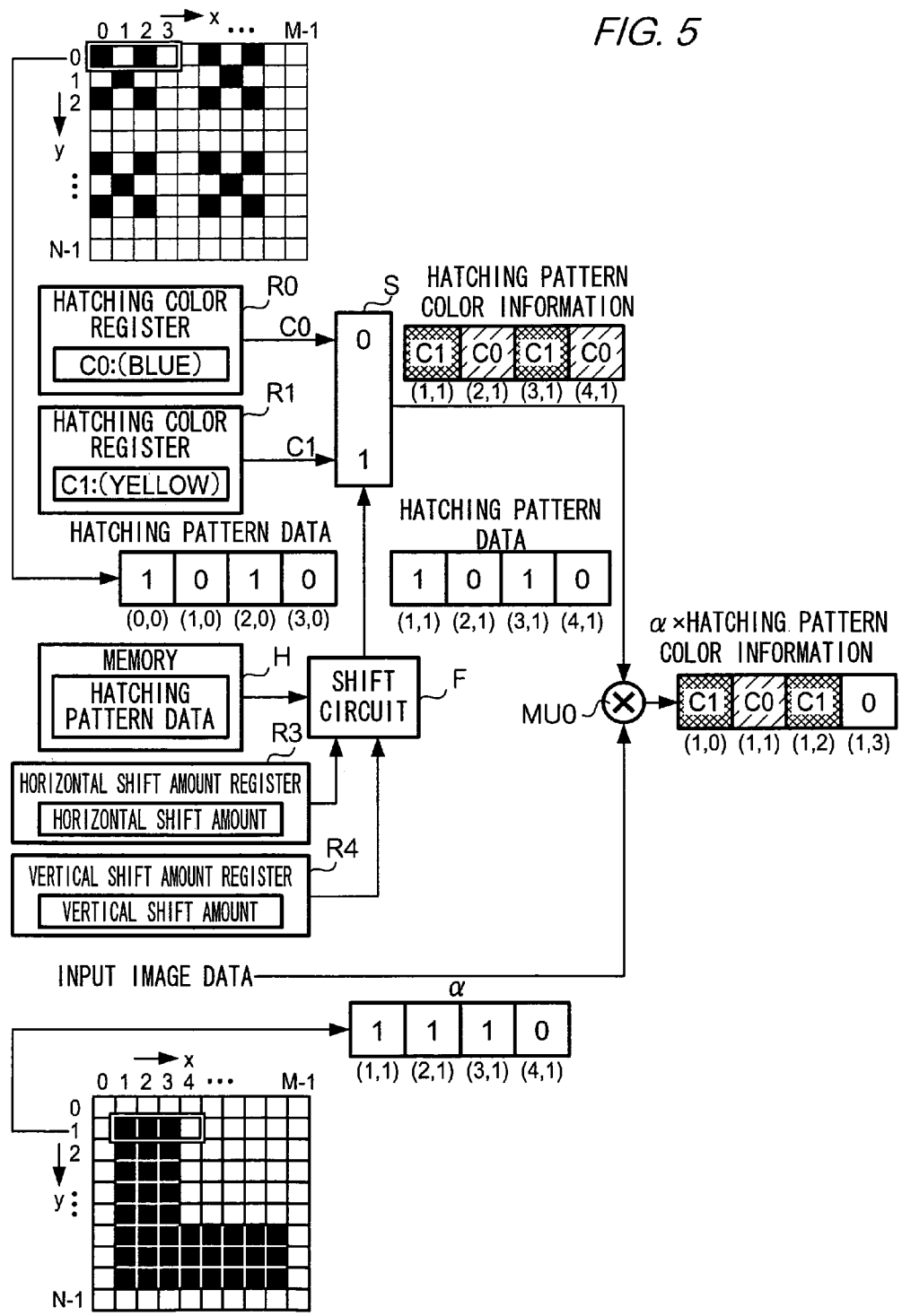
FIG. 5 is a diagram illustrating operations of a shift circuit F, a selector S, and a multiplier MU0.

Next, referring to FIG. 5, operations of the shift circuit F, the selector S, and the multiplier MU0 will be described.

The pixel values of the locations in the input image data shown in FIG. 4 are input into the hatching circuit 250 as "α" according to the order of the location coordinates. For example, the pixel value of the pixel at location coordinates (0, 0) in the input image data is "0", and thus the value "0" is first input as "α". Next, because the pixel value of the pixel at location coordinates (1, 0) in the input image data is also "0", the value "0" is output as "α". In this manner, the pixel values of the uppermost line of the input image data shown in FIG. 4, at location coordinates (2, 0), (3, 0) and so on up to (M−1, 0), are sequentially input into the hatching circuit 250 as "α". When the pixel values of that line have been input into the hatching circuit 250, the pixel values of the pixels belonging to the second line from the top, at location coordinates (0, 1), (1, 1), (2, 1), and so on up to (M−1, 1), are sequentially input into the hatching circuit 250 as "α". The pixel values of the pixels at location coordinates (1, 1), (2, 1), (3, 1), and (4, 1) are "1", "1", "1", and "0", respectively. FIG. 5 illustrates an example in which these pixel values are input in order.

In parallel with this input operation, the hatching pattern data read out from the memory H, the horizontal shift amount read out from the horizontal shift amount register R3, and the vertical shift amount read out from the vertical shift amount register R4 are input into the shift circuit F. The shift circuit F then outputs values resulting from shifting the pattern bit values at each location in the hatching pattern data by the shifting amount based on the horizontal shift amount and the vertical shift amount. In other words, the shift circuit F functions as a pixel value output unit that outputs pixel values at locations distanced from the locations of the pixel values stored in the memory by an amount equivalent to the difference calculated by the calculation unit.

In this example, the horizontal shift amount stored in the horizontal shift amount register R3 is "1", and the vertical shift amount stored in the vertical shift amount register R4 is "1", and therefore the pattern bit values in the hatching pattern are converted to pattern bit values at locations that have been shifted by the horizontal shift amount of "1" in the x direction and the vertical shift amount of "1" in the y direction shown in FIG. 3; the converted pattern bit values are then output. For example, in the case where hatching pattern data such as that shown in FIG. 3 is stored in the memory H, the pattern bit value "1" at location coordinates (0, 0) is converted to the pattern bit value at location coordinates (1, 1) and output. Then, the pattern bit value "0" at location coordinates (1, 0) is converted to the pattern bit value at location coordinates (2, 1) and output. In this manner, the pattern bit value "1" at location coordinates (2, 0) is converted to the pattern bit value at location coordinates (3, 1) and output, and the pattern bit value "0" at location coordinates (3, 0) is converted to the pattern bit value at location coordinates (4, 1) and output. The hatching pattern data output from the shift circuit F is supplied to the selector S.

The color information "C0" read out from the hatching color register R0 and the color information "C1" read out from the hatching color register R1 are input to the selector S as input signals, and the pattern bit values at each location output from the shift circuit F are supplied to the selector S as selection signals. Then, the selector S selects and outputs the color information "C0" during the period in which "0" is being input as the selection signal, and selects and outputs the color information "C1" during the period in which "1" is being input as the selection signal. For example, with regards to the pixel at location coordinates (1, 1) in the hatching pattern data, the pattern bit value is, as described above, "1", and therefore the color information "C1" is output from the selector S. Next, with regards to the pixel at location coordinates (2, 1) in the hatching pattern data, the pattern bit value is "0", and therefore the color information "C0" is output from the selector S. In this manner, with regards to the pixel at location coordinates (3, 1) in the hatching pattern data, the pattern bit value is "1", and therefore the color information "C1" is output, and with regards to the pixel at location coordinates (4, 1) in the hatching pattern data, the pattern bit value is "0", and therefore the color information "C0" is output. The color information output from the selector S is sequentially supplied to the multiplier MU0.

Figure 6:
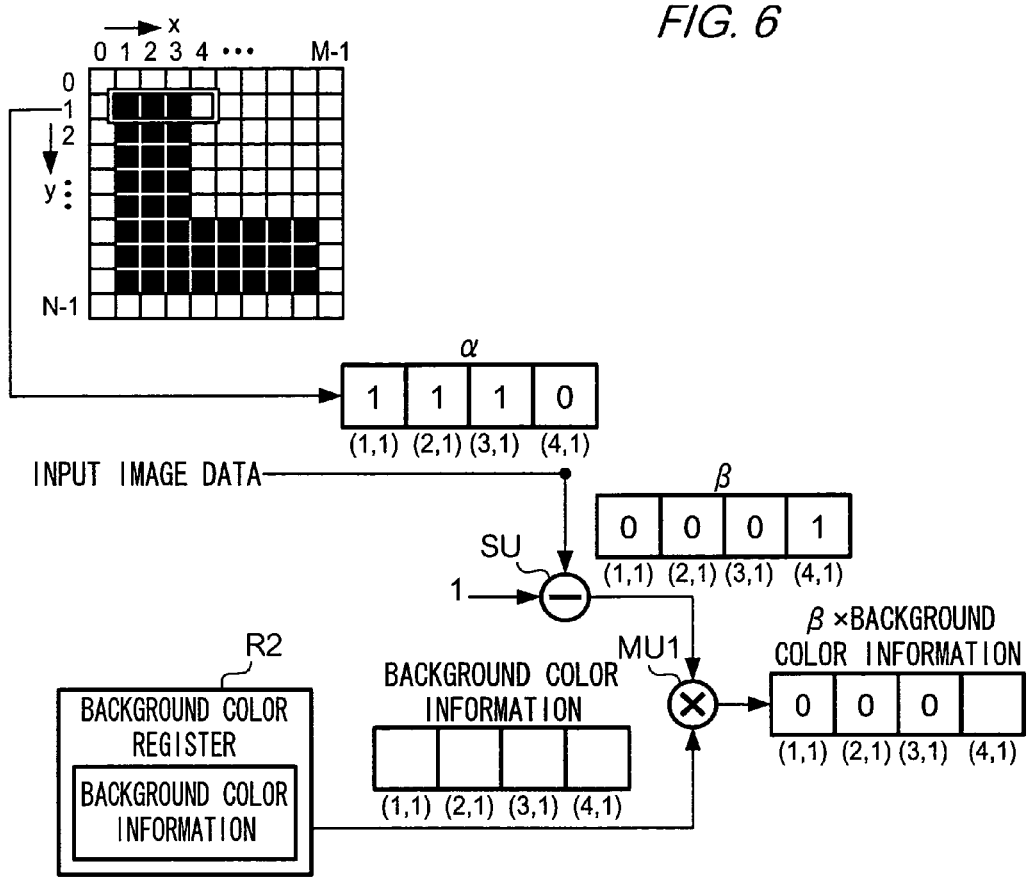
FIG. 6 is a diagram illustrating operations of a subtractor SU and a multiplier MU1.

The multiplier MU0 multiplies the pixel values "α" at each location in the input image data with the color information "C0" or "C1" supplied by the selector S for each of the corresponding pixel locations, outputting "α×C0" or "α×C1". For example, with regards to the pixel at location coordinates (1, 1), α is "1" and the color information is "C1", and therefore 1×C1, or "C1", or in other words, the color information "C1" supplied by the selector S, is output as-is. Then, with regards to the pixel at location coordinates (2, 1), α is "1" and the color information is "C0", and therefore 1×C0, or "C0", or in other words, the color information "C0" supplied by the selector S, is output as-is. Similarly, with regards to the pixel at location coordinates (3, 1), α is "1", and therefore the color information "C1" supplied by the selector S is output as-is. Next, with regards to the pixel at location coordinates (4, 1), a supplied by the selector S is "0", and therefore the value 0×C0, or "0", is output. In this manner, as a result of the multiplication performed by the multiplier MU0, a value of "0" is output for pixels for which the pixel value in the input image data is "0", or in other words, for pixels in the non-rendering region in which the image of the character is not rendered. Meanwhile, the color information of each of the pixels in the hatching pattern data is output for pixels for which the pixel value in the input image data is "1", or in other words, for pixels in the rendering region in which the image of the character is rendered. "α×C0" or "α×C1", or in other words, "α×color information of the hatching pattern", output by the multiplier MU0, is supplied to the adder AD. Next, referring to FIG. 6, operations of the subtractor SU and the multiplier MU1 will be described.

The pixel values "α" at each location in the input image data are supplied to the subtractor SU, in addition to the multiplier MU0 as stated above. "α" and "1" are input into the subtractor SU, and "α" is subtracted from the value "1", resulting in "1−α", "1−α" then being taken as "β" and output. For example, with regards to the pixel at location coordinates (1, 1), α is "1", and therefore the value of 1−1, or "0", is output as "β". Similarly, with regards to the pixel at location coordinates (2, 1), α is "1", and therefore the value of 1−1, or "0", is output as "β", and with regards to the pixel at location coordinates (3, 1) as well, α is "1", and therefore the value of 1−1, or "0", is output as "β". With regards, however, to the subsequent pixel at location coordinates (4, 1), α is "0", and therefore the value of 1−0, or "1", is output as "β". "β" output from the subtractor SU is supplied to the multiplier MU1.

"β" is supplied to the multiplier MU1 by the subtractor SU and the background color information is supplied to the multiplier MU1 by the background color register R2. The multiplier MU1 outputs "β×background color information", in which "β" is multiplied with the background color information for each of the corresponding pixel locations. In other words, "β" becomes "1" for pixels for which the pixel values are "0" in the input image data, or in other words, for pixels in the non-rendering region in which the image of the character is not rendered; therefore, the background color information is output as-is by the multiplier MU1. Meanwhile, "β" becomes "0" for pixels for which the pixel values are "1" in the input image data, or in other words, for pixels in the rendering region of the image of the character; therefore, a value of "0" is output from the multiplier MU1. For example, with regards to the pixel at location coordinates (1, 1), β supplied by the subtractor SU is "0", and thus a value of "0" is output. In the same manner, with regards to the pixels at location coordinates (2, 1) and (3, 1), β supplied by the subtractor SU is "0", and thus a value of "0" is output. However, with regards to the subsequent pixel at location coordinates (4, 1), β supplied by the subtractor SU is "1", and thus the background color information supplied by the background color register R2 is output as-is. "β×background color information" output by the multiplier MU1 is supplied to the adder AD.

Figure 7:
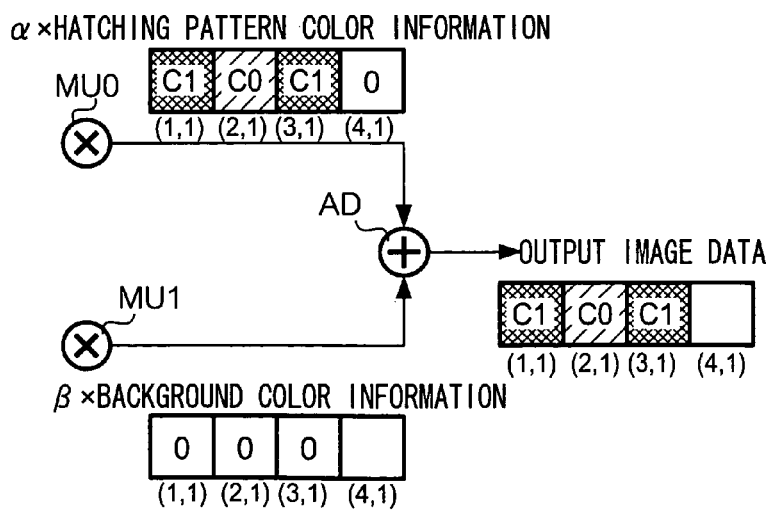
FIG. 7 is a diagram illustrating operations of an adder AD.

Next, referring to FIG. 7, operations of the adder AD will be described.

The adder AD adds "α×hatching pattern color information" supplied by the multiplier MU0 with "β×background color information" supplied by the multiplier MU1 for each of the corresponding pixel locations, and outputs the value resulting from "α×hatching pattern color information+β×background color information". For example, with regards to the pixel at location coordinates (1, 1), the value of "α×hatching pattern color information" supplied by the multiplier MU0 is "C1", and the value of "β×background color information" supplied by the multiplier MU1 is "0", and therefore the color information "C1" of the hatching pattern is output. Meanwhile, with regards to the pixel at location coordinates (2, 1), the value of "α×hatching pattern color information" supplied by the multiplier MU0 is "C0", and the value of "β×background color information" supplied by the multiplier MU1 is "0", and therefore the color information "C0" of the hatching pattern is output. Similarly, with regards to the pixel at location coordinates (3, 1), the value of "α×hatching pattern color information" is "C1", and the value of "β×background color information" is "0", and therefore the color information "C1" of the hatching pattern is output. Finally, with regards to the pixel at location coordinates (4, 1), the value of "α×hatching pattern color information" is "0", and the value of "β×background color information" is "background color information", and therefore the "background color information" is output. In other words, using the adder AD, the color information of the pixels in the rendering region of an input image such as that shown in FIG. 4 is overwritten with the color information of the hatching pattern whose pattern bit values have been shifted by the shift circuit F. Meanwhile, the color information of pixels in the non-rendering region of the input image is overwritten with the background color information. The output image data made up of color information overwritten in this manner is then output by the adder AD. The output image data output by the adder AD is first stored in the VRAM 14, after which it is analyzed by the display control unit 16 and then displayed as an image in the image-stable liquid-crystal display 15.

Figure 8:
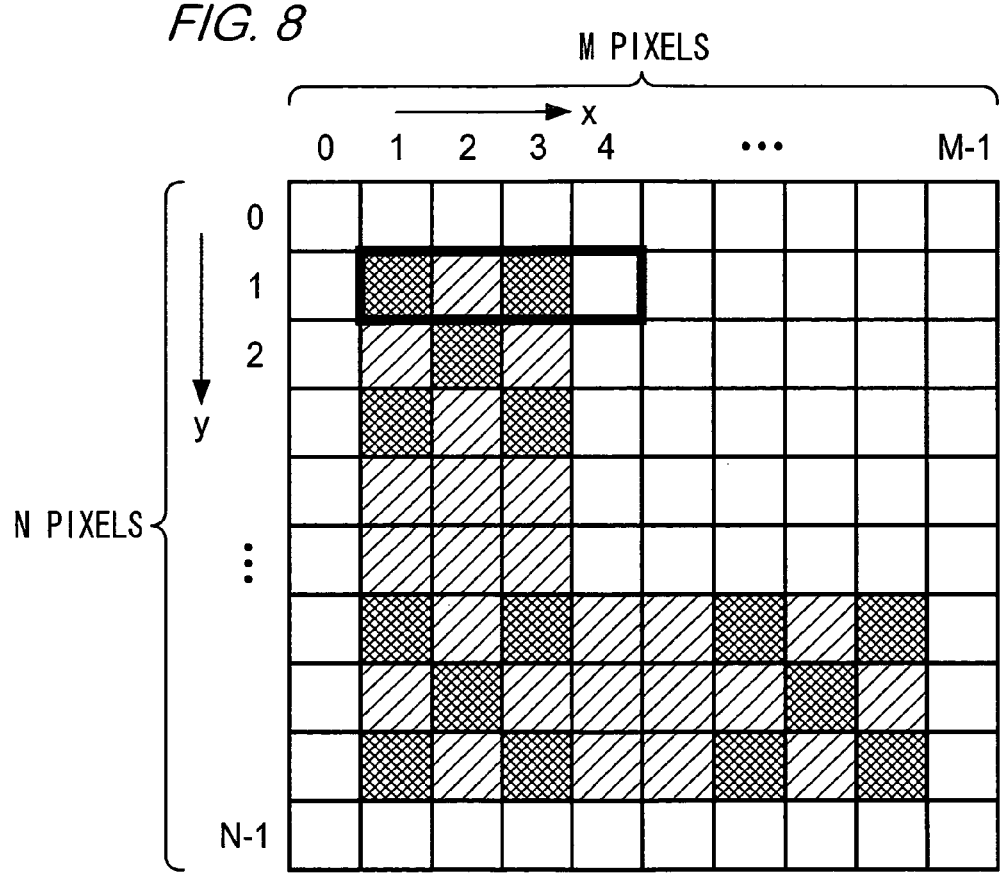
FIG. 8 is a diagram illustrating an output image displayed in an image-stable liquid-crystal display 15.

FIG. 8 is a diagram illustrating an output image displayed in the image-stable liquid-crystal display 15 based on the output image data.

As shown in FIG. 8, hatching expressing a blue and yellow floral pattern, which is equivalent to the hatching pattern shown in FIG. 3 being shifted by "1" in both the x and y directions, has been carried out on this output image in the rendering region of the image of the character "L" shown in FIG. 4. For this reason, the shape of the graphical images that make up the floral motif is not impaired, and the overall motif can be visually recognized. Furthermore, the hatching is not carried out on the non-rendering region of the input image, and thus white, expressed by the background color information, is the background color. For example, the color of the pixel at location coordinates (1, 1) is yellow, as expressed by the color information "C1" of the hatching pattern; the color of the pixel at location coordinates (2, 1) is blue, as expressed by the color information "C0" of the hatching pattern; and the color of the pixel at location coordinates (3, 1) is yellow, as expressed by the color information "C1" of the hatching pattern. The color of the pixel at location coordinates (4, 1), meanwhile, is white, as expressed by the background color information.

Figure 9:
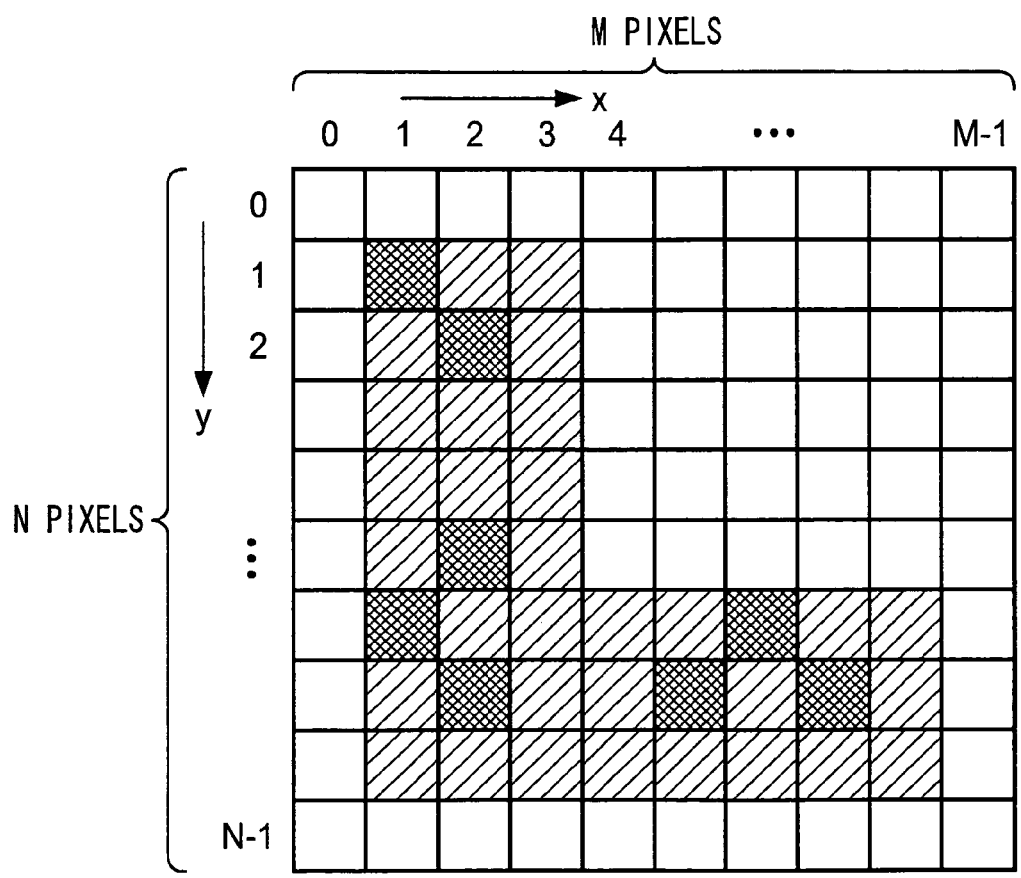
FIG. 9 is a diagram illustrating an output image when pattern bit values are not shifted.

Hatching carried out on the input image in the case where the hatching pattern data stored in the memory H is supplied directly to the selector S, rather than shifting the pattern bit values included in the hatching pattern data using the shift circuit F, will be discussed. FIG. 9 is a diagram illustrating the output image in such a case. As shown in FIG. 9, the graphical images of a blue and yellow floral pattern, which is equivalent to the hatching pattern shown in FIG. 3, have been added in their original position to the output image in the rendering region of the image of the character "L" shown in FIG. 4. In other words, there is skew between the graphical images of the hatching pattern and the rendering region of the input image, and thus the entirety of each graphical image of the hatching pattern does not fit within the rendering region of image of the character, resulting in part of the graphical images appearing absent. With such an output image, it is difficult to visually recognize that hatching with graphical images showing a floral motif has been carried out.

According to the exemplary embodiment described thus far, skew between graphical images included in a hatching pattern and the rendering region of an input image can be reduced to the greatest extent possible when performing a hatching process on the rendering region of the input image. In addition, hatching can be performed on only the rendering region such as a character in the input image using only a circuit with a comparatively simple configuration, including a register, a selector, a shift circuit, a multiplier, an adder, and a subtractor; the trouble of sequentially specifying the location coordinates or the memory addresses of the region on which the hatching is to be performed is thus rendered unnecessary. Furthermore, any shift circuit is sufficient as long as it can shift the pattern bit values by an amount equivalent to the image size of the graphical images in the hatching pattern. For example, if the hatching pattern is as shown in FIG. 3, each graphical image is composed of five horizontal pixels by five vertical pixels. For this reason, as long as the shift circuit F can shift each pattern bit by five in the x direction and 5 in the y direction, the shift circuit F can shift the locations of the pattern bit values so that the entirety of the graphical images in the hatching pattern fits within the rendering region of image of the character regardless of what location has been designated as the target location. Finally, hatching using desired colors can be carried out simply by storing the desired colors in the hatching color registers R0 and R1.

Modified Embodiments

While an exemplary embodiment of the invention has been described above, the content of that exemplary embodiment can be altered in the following ways. The following variations may also be combined as appropriate.

In the exemplary embodiment described above, the shift circuit F outputs values resulting from shifting the pattern bit values in the hatching pattern data by the horizontal shift amount in the x direction (right direction) shown in FIG. 3 and the vertical shift amount in the y direction (lower direction) shown in FIG. 3. However, the shift circuit F may output values resulting from shifting the pattern bit values in the hatching pattern data in the direction opposite to the x direction (left direction) and the direction opposite to the y direction (upper direction) shown in FIG. 3. For example, if the location coordinates (5, 5) of the initial point A4 shown in FIG. 3 are taken as the initial location coordinates and the target location coordinates are (1, 1), the horizontal shift amount is 1−5, or "−4", and the vertical shift amount is 1−5, or "−4". In this case, the shift circuit F outputs values resulting from shifting the pattern bit values in the hatching pattern data by a horizontal shift amount of "−4" in the x direction (right direction) shown in FIG. 3, or in other words, "4" in the direction opposite to the x direction (left direction), and by a vertical shift amount of "−4" in the y direction (lower direction) shown in FIG. 3, or in other words, "4" in the direction opposite to the y direction (upper direction). The same effects as described in the above exemplary embodiment can be obtained with this configuration as well.

In the exemplary embodiment described above, the shift circuit F shifts the pattern bit values in the hatching pattern data by the horizontal shift amount and the vertical shift amount and then outputs the resultant. However, a circuit that converts the location coordinates of the pattern bit values into location coordinates obtained through coordinate calculation and outputs the resultants may be provided instead of the shift circuit F. To be more specific, this circuit calculates, for each pattern bit value, location coordinates in which the horizontal shift amount has been added to the x location coordinate and the vertical shift amount has been added to the y location coordinate, after which the circuit converts the location coordinates of those pattern bit values into the calculated location coordinates and outputs the resultant. For example, in the case where the horizontal shift amount is "1" and the vertical shift amount is "1", 1+1, or "2", is calculated as the x location coordinate and 0+1, or "1", is calculated as the y location coordinate for the pattern bit value "0" at location coordinates (1, 0). Then, the location coordinates of this pattern bit value "0" are converted to the calculated location coordinates (2, 1) and output. In other words, a pattern bit value of "0" at location coordinates (2, 1) is output, in the same manner as with the shift circuit F described in the above exemplary embodiment. Therefore, the same effects as described in the above exemplary embodiment can be obtained with this configuration as well.

Although the exemplary embodiment described above discusses the details of a hatching process using an example in which the hatching pattern data for performing the floral pattern hatching shown in FIG. 3 is stored in the memory H and the input image data expressing an "L" character shown in FIG. 4 is input, the content of the input image, the hatching pattern, and so on are not intended to be limited to this example.

Figure 10:
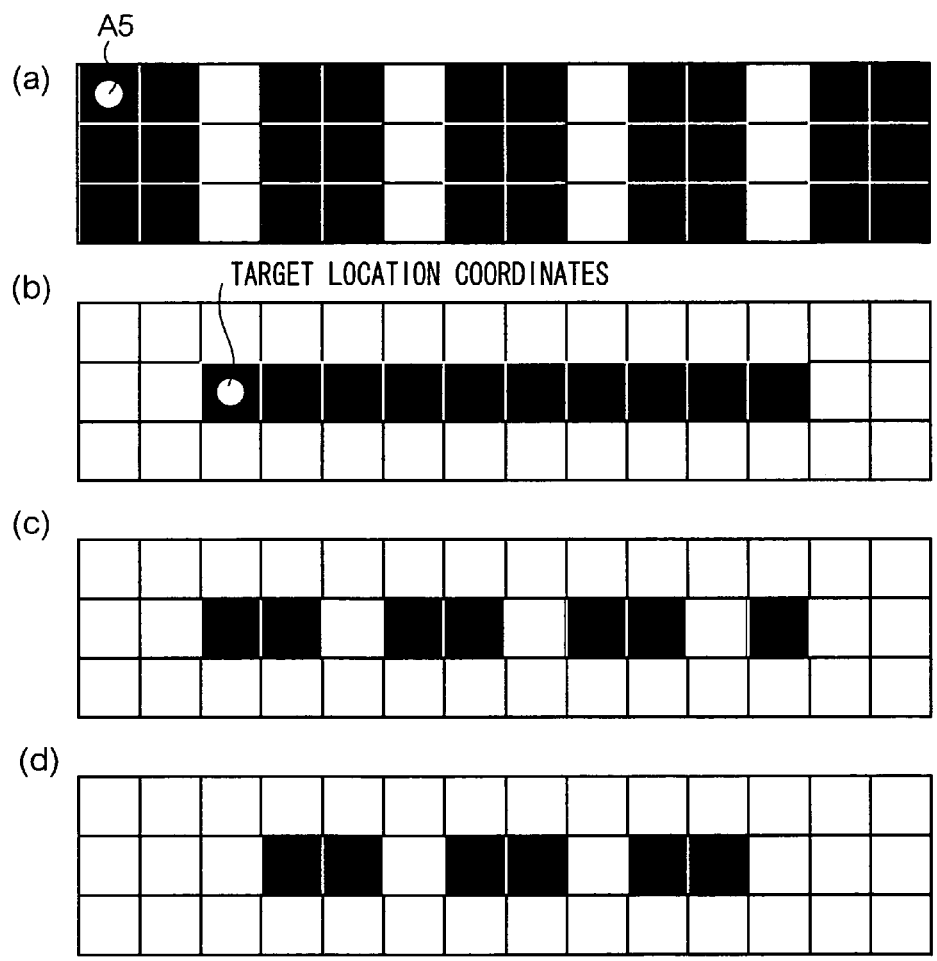
FIG. 10 is a diagram illustrating hatching pattern data, input image data, and an output image according to a variation.

For example, a case can be considered where hatching pattern data for performing hatching using a vertical stripe pattern, as shown in (a) of FIG. 10, is stored in the memory H, and input image data expressing a straight line, as shown in (b) of FIG. 10, is input. When the location coordinates of an initial point A5 in the hatching pattern data shown in (a) of FIG. 10 are taken as the initial location coordinates and the location coordinates of the pixel at the left end of the straight line shown in (b) of FIG. 10 are taken as the target location coordinates, output image data expressing the output image shown in (c) of FIG. 10 is output from the hatching circuit 250. As shown in (c) of FIG. 10, in this output image, hatching is performed so that the staring point A5 of the graphical images shown in (a) of FIG. 10 matches up with the staring point of the straight line shown in (b) of FIG. 10, and thus a broken line with a clear endpoint is rendered. If, at this time, color information that is the same as the background color is stored in the hatching color register R0, and color information that is the same as the straight line that is the input image is stored in the hatching color register R1, the straight line input as the input image can be rendered as a broken line with a clear endpoint in the same color as that straight line. Furthermore, by changing the hatching pattern, various broken lines, such as dot-dash lines, dot-dot-dash lines, and so on, can be obtained.

Next, a case where the hatching pattern data is supplied directly to the selector S without shifting the pattern bit values of the hatching pattern data will be considered. (d) in FIG. 10 illustrates an output image obtained in this case. As shown in (d) of FIG. 10, in this output image, hatching expressing the vertical stripe pattern corresponding to the hatching pattern shown in (a) of FIG. 10 has been performed in its original position, in the rendering region of the straight line shown in (b) of FIG. 10. As described above, in the case where color information that is the same as the background color is stored in the hatching color register R0, color information for which the pattern bit value is "0" is overwritten with color information that is the same as the background color, and thus a broken line in which the end point appears absent and thus appears shortened is rendered, as shown in (d) of FIG. 10.

Although in the exemplary embodiment described above, the target location coordinates are stored in the storage device 23 in advance for each input image expressed by each instance of input image data input into the hatching circuit 250, the target location coordinates may be designated by a user through operations of the key 22. Alternatively, the CPU 11 may analyze the input image data, identify the location coordinates of the pixel at the upper-left end of the image of the character expressed by the input image data, and take the identified location coordinates as the target location coordinates.

In addition, the initial point of the graphical images as described above may be designated by the CPU 11 in accordance with the target location coordinates. For example, when the location coordinates (3, 1) of the pixel in the upper-right end of the image of the character shown in FIG. 4 are designated as the target location coordinates, the initial location coordinates are the location coordinates of the pixel in the upper-right end of the graphical images, and are, for example, (2, 0). Similarly, when the location coordinates of the pixel in the lower-left end of the image of the character are designated as the target location coordinates, the initial location coordinates are the location coordinates of the pixel in the lower-left end of the graphical images, and when the location coordinates of the pixel in the lower-right end of the image of the character are designated as the target location coordinates, the initial location coordinates are the location coordinates of the pixel in the lower-right end of the graphical images. In other words, any initial point for the graphical image is acceptable as long as the entirety of the graphical images that include that initial point is in a location included within the rendering region of the input image expressed by the input image data in the case where the locations of the pattern bit values of the hatching pattern data have been shifted to locations distanced by an amount equivalent to the difference between the target locations and the initial point of the graphical images. Accordingly, the target location coordinates or the initial location coordinates do not need to be determined in advance.

In addition, in the exemplary embodiment described above, the CPU 11 identifies the initial location closest to the target location coordinates from among the multiple initial locations stored per graphical image in the storage device 23 as the initial location coordinates. However, the invention is not limited thereto, and, for example, only the initial location of the graphical image closest to the origin point may be stored in the storage device 23, and the CPU 11 may then calculate the difference between that the initial location and the target location coordinates of the input image data.

In the exemplary embodiment described above, only binary values for the gradation values of the color information, which take into consideration only whether or not the color expressed by the color information is present, are assumed, and thus the color information C0 and C1 of the hatching pattern respectively indicate the color itself and, simultaneously, that that color is "present". However, in the case where the image-stable liquid-crystal display 15 is capable of displaying a single color with three or more gradations, the color information includes information that designates the color itself and a gradation value thereof.

In the exemplary embodiment described above, the inverter that inverts the binary input image data is realized by the subtractor SU, but the invention is not limited thereto; for example, the inverter may be realized by a configuration in which the binary input image data is taken as a selection signal, an input signal "0" is selected and output when a selection signal of "1" is input, and an input signal "1" is selected and output when a selection signal of "0" is input.

Furthermore, the input image data does not need to be binary data composed of "1" and "0", and may instead be binary data composed of "0" and an integer value aside from "0", such as "0" and "15". In this case, when the multiplier MU0 multiplies a value aside from "0" with the color information of the hatching pattern, and the multiplication is carried out as-is, the color information of the hatching pattern will be multiplied by the amount of that integer value. Accordingly, it is necessary to preset the color information of the hatching data to be "1/integer value" or divide that integer value by itself to obtain "1" prior to inputting the integer value into the multiplier MU0. Note that any input image data is acceptable as long as it is binary data at the point in time when it is input into the hatching circuit 250 shown in FIG. 2, and in the case where the image is originally expressed by multivalued data, the multivalued data may be converted into binary data and then input into the hatching circuit 250.

The regions aside from the regions in which hatching is performed make up, to put it simply, the background region, and the background color information stored in the background color register R2, as described in the exemplary embodiment, may be used as the image data for displaying the background region, or the input image data input into the hatching circuit 250 may be used as the image data for displaying the background region. In the case of the latter, a circuit configuration that supplies the input image data to the multiplier MU1 rather than the background color information read out from the background color register R2 may be used. As a result, the color of the background region in the output image can be made the same as the color of the background region in the input image.

Furthermore, one of the background color information stored in the background color register R2 and the input image data input into the hatching circuit may be designated.

Figure 11:
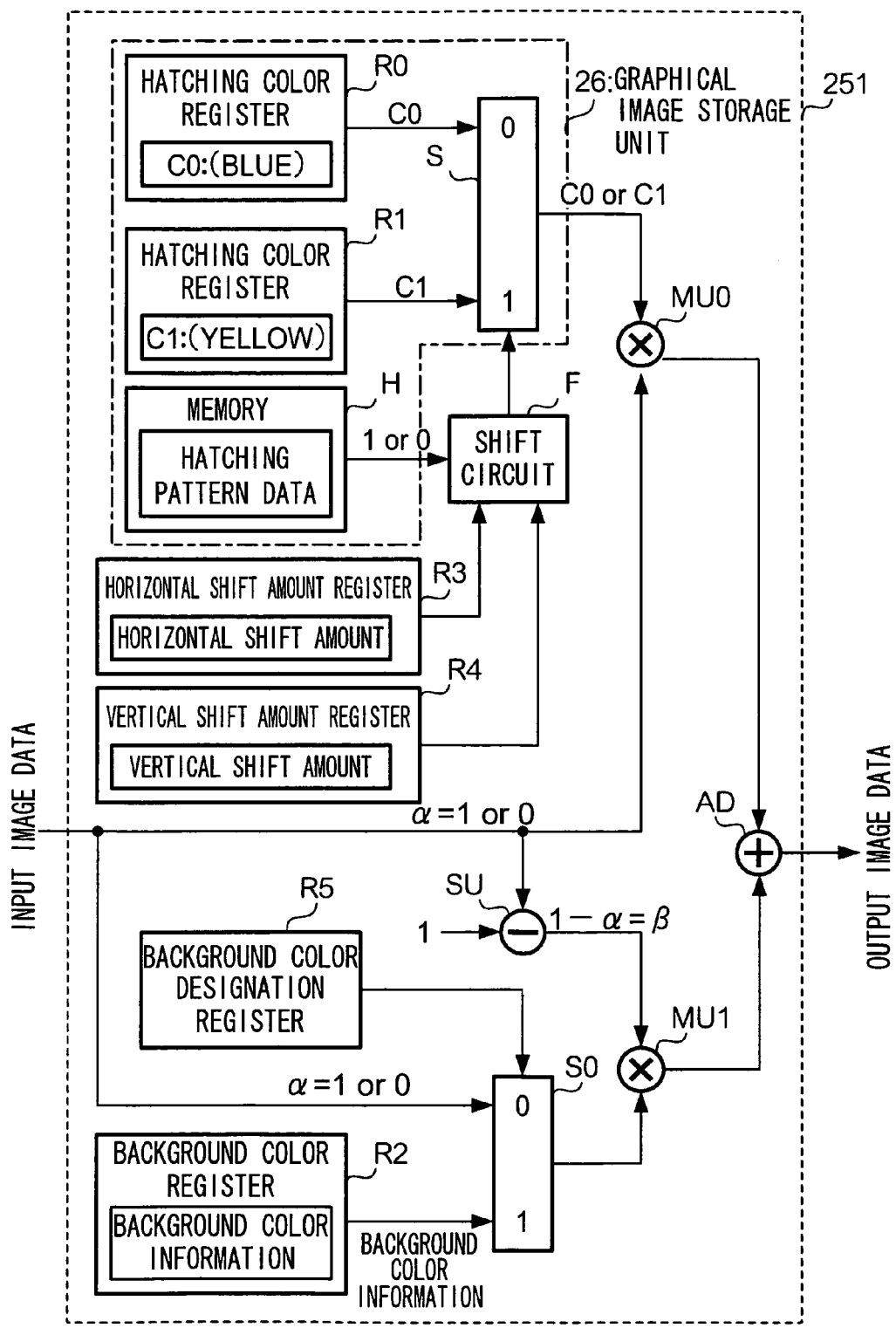
FIG. 11 is a diagram illustrating the configuration of a hatching circuit 251 according to a variation.

FIG. 11 is a diagram illustrating a hatching circuit 251 in such a case. A background color designation register R5 and a selector S0 are further provided in the hatching circuit 251. Other elements of the configuration are identical to those of the hatching circuit 250 shown in FIG. 2.

The background color designation register R5 stores a selection signal for designating a pixel value "α" for each location in the input image data or the background color information stored in the background color register R2. In other words, the background color designation register R5 functions as a designator that designates the pixel values of each location in a binary input image data or the pixel values of each location in the background color information. The selection signal stored in the background color designation register R5 may be rewritten by the CPU 11 based on operations of the key 22 performed by a user.

The pixel values "α" of the input image data and the background color information stored in the background color register R2 are input into the selector S0 as input signals. The selection signal stored in the background color designation register R5 is also input into the selector S0. When a selection signal designating the pixel values "α" of each location in the input image data (here, "0") has been input, the selector S0 selects and outputs the pixel values "α" of the input image data. However, when a selection signal designating the background color information stored in the background color register R2 (here, "1") has been input, the selector S0 selects and outputs the background color information. In other words, the selector S0 functions as a supplier that supplies the pixel values designated by the background color designation register R5 to the multiplier MU1 serving as the second multiplier.

As a result, the color of the non-rendering region or the background color of the input image can be designated as the color of the background region in the output image.

In the exemplary embodiment described above, the image data stored in the VRAM 14 is displayed in the image-stable liquid-crystal display 15 by the display control unit 16. However, the image data on which the hatching process has been performed may be used in printing. For example, the output image data output by the adder AD may be written into the RAM 13, and that output image data may then be supplied to a printing unit as image data equivalent to an image printed on a single sheet of paper. The printing unit performs printing based on the supplied image data, and forms an image expressing the image data on the sheet of paper.

Although the background color information stored in the background color register R2 is supplied as-is to the multiplier MU1 in the exemplary embodiment described above, in the case where the background color information is stored in the VRAM 14 in addition to the background color register R2, one of the pieces of background color information may be selected and supplied to the multiplier MU1.

Figure 12:
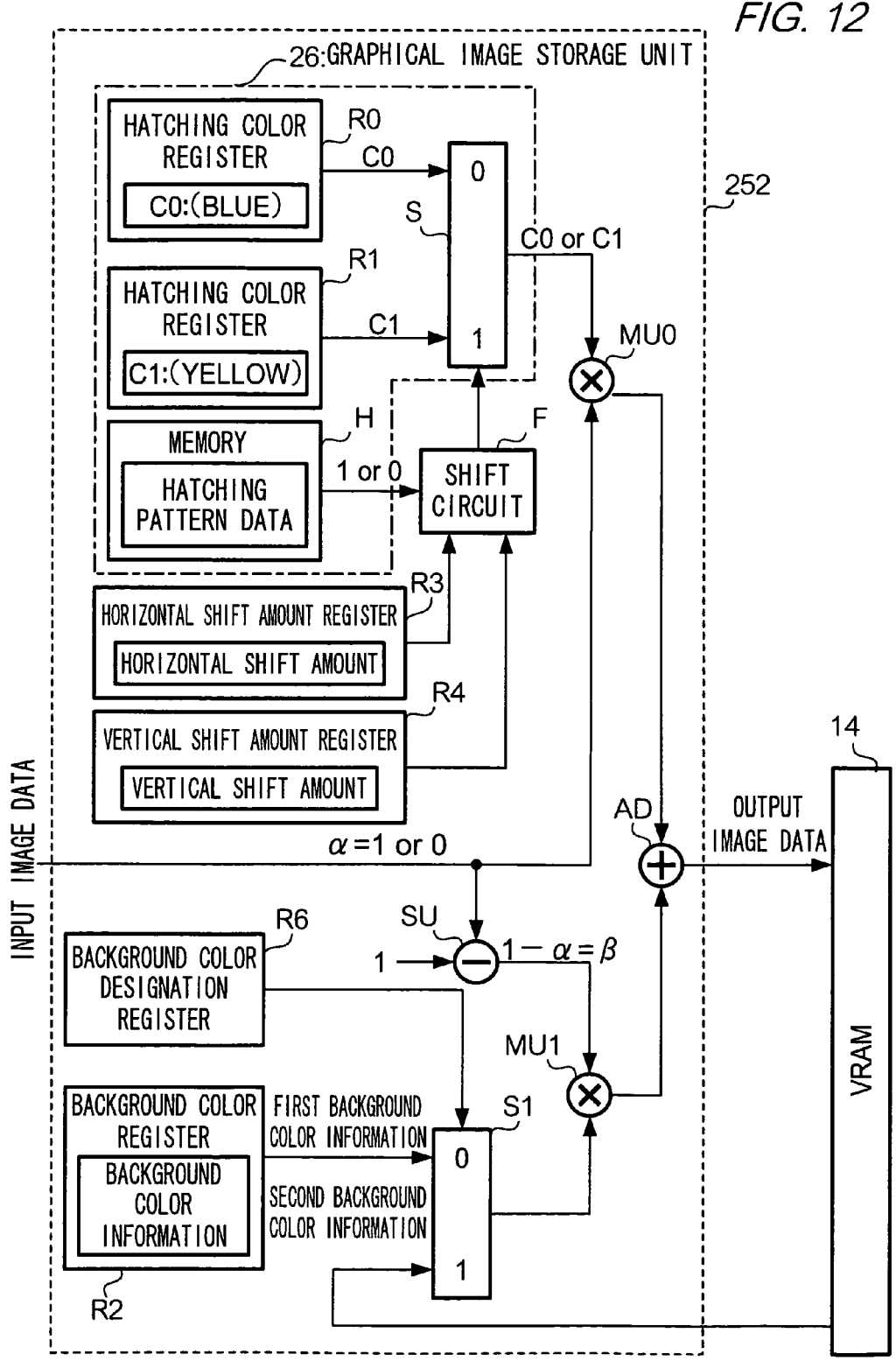
FIG. 12 is a diagram illustrating the configuration of a hatching circuit 252 according to a variation.

FIG. 12 is a diagram illustrating the configuration of a hatching circuit 252 according to this variation. A background color designation register R6 and a selector S1 are further provided in the hatching circuit 252. Other elements of the configuration are identical to those of the hatching circuit 250 shown in FIG. 2.

The background color designation register R6 stores a selection signal for designating first background color information stored in the background color register R2 or second background color information stored in the VRAM 14. In other words, the background color designation register R6 functions as a designator that designates the background color register R2 that stores the preset first background color information or the VRAM 14 in which the image information output to the image-stable liquid-crystal display 15 is expanded. The selection signal stored in the background color designation register R6 may be rewritten by the CPU 11 based on operations of the key 22 performed by a user.

The first background color information stored in the background color register R2 and the second background color information stored in the VRAM 14 are input into the selector S1 as input signals. The selection signal stored in the background color designation register R6 is also input into the selector S1. When a selection signal designating the background color register R2 is input (here, "0"), the selector S1 selects and outputs the first background color information read out from the background color register R2. However, when a selection signal designating the VRAM 14 is input (here, "1"), the selector S1 selects and outputs the second background color information read out from the VRAM 14. In other words, the selector S1 functions as a supplier that reads out information stored in the storage unit designated by the background color designation register R6, or in other words, stored in the background color register R2 or the VRAM 14, as pixel values included in the background color information, and supplies the information to the multiplier MU1 serving as the second multiplier.

Meanwhile, in the case where the image is output (displayed or printed) by a display unit or a printing unit, the image information of that output image is expanded in a storage unit such as the RAM 13, and is then supplied to the display unit or the printing unit after first being stored in the RAM 13. The image information of the output image stored in the RAM 13 may be used as the background color information described in the above exemplary embodiment. In such a case, the background color designation register R6 functions as a designator that designates the background color register R2 that stores the preset first background color information or the RAM 13 that stores the image information of the output image. Furthermore, the selector S1 functions as a supplier that reads out background color information or image information stored in the storage unit designated by the background color designation register R4, or in other words, stored in the background color register R2 or the RAM 13, as pixel values of the background color information in the above exemplary embodiment, and supplies the information to the multiplier MU1 serving as the second multiplier. As a result, the storage unit such as the RAM 13 can be selected as the supply source of the background color information.

In the exemplary embodiment described above, the hatching circuit 250 is provided in the image processing circuit 25. However, the hatching circuit 250 may be provided in another device, such as the display control unit 16.

The hatching circuit 250 may be used in a personal computing device, mobile telephone device, electronic book, or the like that has a display device that displays an image based on image data.

What is claimed is:

1. An image processing circuit comprising:
  a image memory that stores the location and pixel value of each pixel that composes a plurality of graphical images disposed in an arrangement;
  a calculation unit that calculates a difference between a target location representative of a target to which the graphical images are to be aligned in binary image data in which the pixel value at each location is expressed as a binary value that includes 0 and an initial location representative of an initial point in the graphical images for aligning to the binary image data;
  a pixel value output unit that outputs pixel values resulting from shifting the pixel values stored in the image memory by an amount equivalent to the difference calculated by the calculation unit;
a first multiplier that multiplies the pixel value at each location output by the pixel value output unit with the pixel value at each location included in the binary image data, for each of the corresponding pixel locations;
an inverter that inverts the pixel value at each location in the binary image data;
a second multiplier that multiplies the pixel values at each location in the binary image data or the pixel values at each location included in background image data that is to be the background of an image based on the binary image data with the pixel values inverted by the inverter, for each of the corresponding pixel locations; and
an adder that adds the result of the multiplication performed by the first multiplier with the result of the multiplication performed by the second multiplier for each of the corresponding pixel locations and outputs the result of the adding as output image data.

2. The image processing circuit according to claim 1, further comprising a location memory that stores the target location in the binary image data and the initial location in the graphical images,
wherein the calculation unit calculates the difference between the target location and the initial location stored in the location memory.

3. The image processing circuit according to claim 1, further comprising:
a target acceptor that accepts a designation of the target location made by a user; and
an initial point specification unit that specifies the initial location in the graphical images in accordance with the target location accepted by the target acceptor,
wherein the calculation unit calculates the difference between the target location accepted by the target acceptor and the initial location specified by the initial point specification unit.

4. The image processing circuit according to claim 1, further comprising:
an initial location memory that stores the initial location representative of the initial point for each graphical image; and
an initial point specification unit that specifies, from among the plurality of initial locations stored in the initial location memory, the initial location that is closest to the target location as the initial location of the initial point for aligning to the binary image data,
wherein the calculation unit calculates the difference between the target location and the initial location specified by the initial point specification unit.

5. The image processing circuit according to claim 1, wherein the image memory comprises:
a first memory that stores the location of each pixel that composes the plurality of graphical images;
a second memory that stores color information expressing a color of the graphical images as a pixel value of each pixel that composes the plurality of graphical images; and
a color information output unit that outputs the color information stored in the second memory as pixel values of the pixels in each location stored in the first memory.

6. The image processing circuit according to claim 5, wherein the second memory stores a plurality of types of color information; and
the color information output unit outputs one of the plurality of types of color information stored in the second memory for each pixel that composes the same type of graphical image among the plurality of graphical images.

7. A display device comprising:
a image memory that stores the location and pixel value of each pixel that composes a plurality of graphical images disposed in an arrangement;
a calculation unit that calculates a difference between a target location representative of a target to which the graphical images are to be aligned in binary image data in which the pixel value at each location is expressed as a binary value that includes 0 and an initial location representative of an initial point in the graphical images for aligning to the binary image data;
a pixel value output unit that outputs pixel values resulting from shifting the pixel values stored in the image memory by an amount equivalent to the difference calculated by the calculation unit;
a first multiplier that multiplies the pixel value at each location output by the pixel value output unit with the pixel value at each location included in the binary image data, for each of the corresponding pixel locations;
an inverter that inverts the pixel value at each location in the binary image data;
a second multiplier that multiplies the pixel values at each location in the binary image data or the pixel values at each location included in background image data that is to be the background of an image based on the binary image data with the pixel values inverted by the inverter, for each of the corresponding pixel locations;
an adder that adds the result of the multiplication performed by the first multiplier with the result of the multiplication performed by the second multiplier for each of the corresponding pixel locations and outputs the result of the adding as output image data; and
a display that displays an image based on the output image data output by the adder.

8. A printing device comprising:
a image memory that stores the location and pixel value of each pixel that composes a plurality of graphical images disposed in an arrangement;
a calculation unit that calculates a difference between a target location representative of a target to which the graphical images are to be aligned in binary image data in which the pixel value at each location is expressed as a binary value that includes 0 and an initial location representative of an initial point in the graphical images for aligning to the binary image data;
a pixel value output unit that outputs pixel values resulting from shifting the pixel values stored in the image memory by an amount equivalent to the difference calculated by the calculation unit;
a first multiplier that multiplies the pixel value at each location output by the pixel value output unit with the pixel value at each location included in the binary image data, for each of the corresponding pixel locations;
an inverter that inverts the pixel value at each location in the binary image data;
a second multiplier that multiplies the pixel values at each location in the binary image data or the pixel values at each location included in background image data that is to be the background of an image based on the binary image data with the pixel values inverted by the inverter, for each of the corresponding pixel locations;
an adder that adds the result of the multiplication performed by the first multiplier with the result of the multiplication performed by the second multiplier for each of the corresponding pixel locations and outputs the result of the adding as output image data; and
a printer that prints based on the output image data output by the adder.

* * * * *

UNITED STATES PATENT AND TRADEMARK OFFICE
CERTIFICATE OF CORRECTION

| | |
|---|---|
| PATENT NO. | : 8,326,083 B2 |
| APPLICATION NO. | : 12/222422 |
| DATED | : December 4, 2012 |
| INVENTOR(S) | : Yoshiyuki Ono et al. |

It is certified that error appears in the above-identified patent and that said Letters Patent is hereby corrected as shown below:

Title page, in item [75], change "Sawasaki" to "Sawazaki"

Signed and Sealed this
Twenty-third Day of July, 2013

Teresa Stanek Rea
*Acting Director of the United States Patent and Trademark Office*